United States Patent

[11] 3,612,966

| | | | |
|---|---|---|---|
| [72] | Inventor | Frank R. Dybel | |
| | | 512 Mackinaw, Calumet City, Ill. 60643 | |
| [21] | Appl. No. | 873,207 | |
| [22] | Filed | Nov. 3, 1969 | |
| [45] | Patented | Oct. 12, 1971 | |

[54] PIEZOELECTRIC TRANSDUCER WITH IMPROVED SENSING CIRCUIT
13 Claims, 4 Drawing Figs.

[52] U.S. Cl. .................................................. 317/123, 310/8.1, 317/148.5
[51] Int. Cl. ................................................. H01h 47/00, H01h 47/32
[50] Field of Search ........................................ 317/144, 148.5, 153, 123; 73/133 D; 310/8.1, 8.4; 324/56; 338/2; 340/261

[56] References Cited
UNITED STATES PATENTS

| | | | |
|---|---|---|---|
| 3,389,275 | 6/1968 | Brothers .................... | 310/8.3 |
| 3,438,326 | 4/1969 | Thomanek et al. .......... | 310/8.7 |
| 3,374,663 | 3/1968 | Morris ...................... | 310/8.4 X |
| 3,394,275 | 7/1968 | Lippman .................... | 340/261 X |
| 3,444,390 | 5/1969 | Breidenbach et al. ....... | 310/8.1 |
| 3,130,329 | 4/1964 | Cother ...................... | 310/8.1 |
| 3,374,663 | 3/1968 | Morris ...................... | 310/8.4 X |
| 3,444,390 | 5/1969 | Breidenbach et al. ....... | 310/8.1 |

*Primary Examiner*—D. F. Duggan
*Assistant Examiner*—Ulysses Weldon
*Attorney*—Wolfe, Hubbard, Leydig, Voit & Osann, Ltd.

ABSTRACT: An improved sensing circuit particularly adapted for use with a piezoelectric transducer or the like, which transducer is characterized by its extremely high internal impedance. The transducer is disposed in a normally balanced input circuit so that there is effectively zero current flowing through the transducer when it is not activated. A unity-voltage-gain, high-current-gain amplifier is biased to its linear conduction operating point so as to present an extremely high dynamic input impedance to the output signal from the transducer. The amplifier output is applied to trigger a variable threshold, variable current output control circuit having a relay as an indicating device.

PATENTED OCT 12 1971 3,612,966

INVENTOR.
FRANK R. DYBEL,
BY Wolfe, Hubbard, Voit & Osann
ATTORNEYS.

PIEZOELECTRIC TRANSDUCER WITH IMPROVED SENSING CIRCUIT

This invention relates to transducer-sensing circuits in general, and in particular to sensing circuits for use with piezoelectric crystal transducers.

The signal-generating capabilities of piezoelectric crystal transducers when subjected to stress have made such transducers a logical choice for many measuring and overload sensing applications in place of the conventional strain gauges of the resistance type. For example, the crystal may act as an overload sensor when mounted between two brackets fixed to a force carrying member of a press, an arrangement which is discussed in detail in my copending application "Piezoelectric Transducer Sensor," Ser. No. 832,542, filed May 12, 1969. As illustrated in that application, the structural simplicity and the high voltage output of the crystal transducer allow it to be used for general overload-sensing applications with a minimum of interface circuitry.

The piezoelectric crystal transducer is particularly attractive for high-precision sensing applications, in which case the crystal performance and the performance of the associated interface circuitry must remain essentially constant over periods of time and varying temperatures. The crystal itself presents certain design constraints when used for such high-precision applications, since it is a very high impedance device and is therefore sensitive to the loading effects of the circuitry attached to it. Furthermore, due to its active nature as a signal generator or "voltaic" device, it operates most effectively when it is free from externally applied bias currents or voltages.

The circuitry of the present invention is particularly adapted to overcome these crystal interface problems.

Specifically, it is an object of the present invention to provide a sensing circuit which is suited for use with transducers having a very high internal impedance. It is the related object of the present invention to provide such a sensing circuit which is high sensitive to transducer output while presenting a minimum of loading effect to the transducer in both its static and dynamic conditions.

Another object of the present invention is the provision of a sensing circuit having a very low power drain in the static condition and a power requirement in its operative state which is readily adjustable for optimum efficiency.

A further object of the present invention is the provision of a highly sensitive sensing circuit which is nonetheless capable of being constructed at a very reasonable cost and with the most readily available circuit elements.

Other objects and advantages of the present invention will become evident upon reading the following detailed description and upon reference to the drawings in which.

While the invention has been described in connection with the preferred embodiment, it will be understood that I do not intend to be limited to the particular embodiments set forth, but intend, on the contrary, to cover the various alternatives, modifications and equivalents as may be included within the spirit and scope of the invention.

DESCRIPTION OF THE ILLUSTRATED EMBODIMENTS

Figure 1:
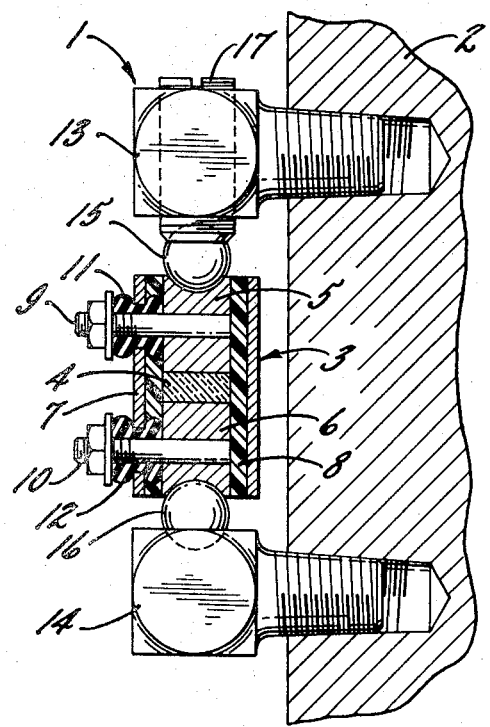
FIG. 1 is a side view, partially in cross section of a force carrying member of a power press having mounted thereon a piezoelectric crystal device constituting the transducer used in the circuitry of the present invention.
Figure 2:
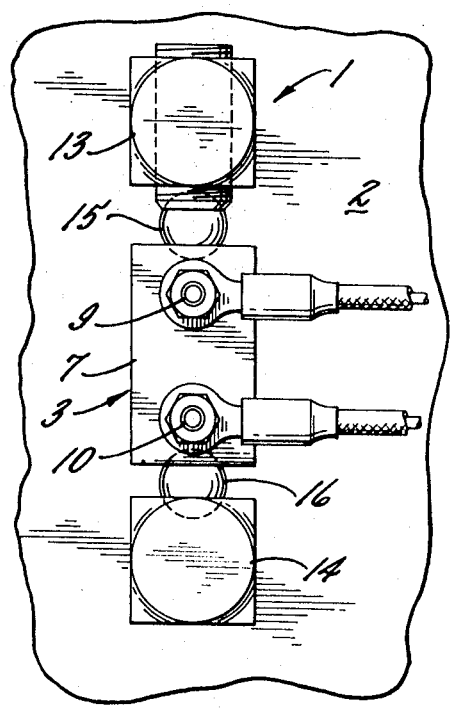
FIG. 2 is a front view of the transducer of FIG. 1.
Figure 3:
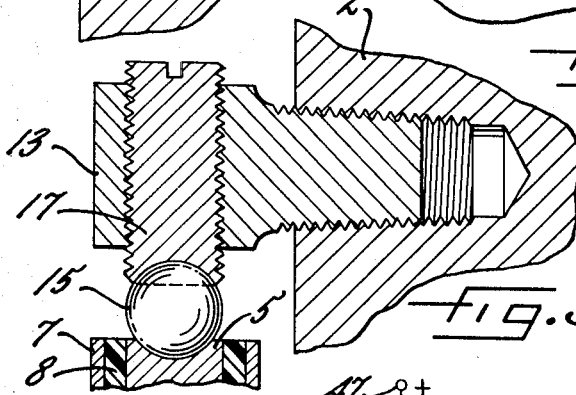
FIG. 3 is a cross-sectional view of the top bracket of FIG. 1 showing the adjustable clamping means thereof and the engagement with the terminal block.

Turning now to the drawings, there is shown in FIGS. 1-3 a piezoelectric transducer unit 1 particularly adapted for use in the sensing device of the present invention. The transducer unit 1 is shown and described in more detail in applicant's copending application Ser. No. 832,542, noted above. As shown herein, the unit is mounted on a force-carrying member 2 of a press. The piezoelectric transducer 3 is shown in cross section as consisting of a piezoelectric ceramic crystal 4 positioned between a top terminal block 5 and a bottom terminal block 6 with the top and bottom faces of the crystal in contact with and against the surface of each of the respective terminal blocks. The terminal blocks and crystal are surrounded by a metallic sheath 7 which serves as a magnetic and electric shield. The sheath is slightly larger than the terminal blocks and crystal to provide space for a surrounding layer 8 of an encapsulating and insulating plastic material. Leading from the terminal blocks through the insulating layer 8 and the metallic sheath 7 are terminals 9 and 10 with suitable connections for attachment of leads to the electronic circuit. The leads attached to the terminals are shown in FIG. 2, and may be suitably shielded cables. The terminals and hence the terminal blocks are electrically insulated from the sheath 7 at the passageway therethrough by the terminal insulators 11 and 12. The sheath 7 is grounded to the shield of the shielded cables by suitable connections, not shown.

The piezoelectric transducer 3 is mounted on the force-carrying member 2 so that a line normal to the crystal faces at the interfaces between the crystal and the terminal blocks is parallel to and aligned with the stress to be measured in the member 2 when under load during a working cycle. The transducer 3 is supported between two points on the member 2 and is spaced therefrom The supported transducer provides what may be characterized as a parallel mechanical circuit for shunting a small portion of the stress in the member 2 to the transducer 3. When so subjected to the stress, the transducer produces its output signal.

The piezoelectric transducer as shown in FIGS. 1-3, is clamped between the ends of two brackets 13 ans 14. The brackets shown are screw-in type brackets, but the brackets may be fixed to the member 2 by other means, e.g., by welding. The ends of the brackets between which the transducer is clamped are provided with ball and socket joints. The balls 15 and 16 engage the terminal blocks 5 and 6, respectively. The brackets are electrically insulated from the terminal blocks in this embodiment by balls 15 and 16 of a refractory insulating material.

Means are provided for adjusting the distance between the balls of the brackets for ease in positioning and aligning the transducer therebetween. This feature is provided by a setscrew 27 in the end of the top bracket 13, as shown most clearly in FIG. 3. As also shown there, a socket is formed in the top terminal block 5 for the ball 15. After the transducer 3 is in position, the setscrew is screwed to clamp it in place under a slight clamping pressure. This places the crystal in a prestressed condition. The amount to which the crystal is prestressed must be sufficient so that it is in a stressed condition under all possible conditions of loading during the work cycle of the press.

The piezoelectric transducer produces a high open circuit peak output voltage, typically as high as several thousand volts, during the work cycle of the machine to which it is connected. In most instances it will be desirable to temper this signal to a degree when it is applied to an electrical indicating or detecting circuit. However, for optimum performance of the crystal transducer, it is desirable to avoid the application of any external biasing currents or voltages to the piezoelectric material itself.

Therefore, in accordance with the present invention, an improved sensing circuit is provided which is particularly adapted for use with the piezoelectric transducer described above. This circuit includes amplifying means coupled to the transducer and including two direct-coupled transistors and an input circuit which leaves the transducer effectively bias free during its operation. The transducer output signal is current amplified by the amplifier, but the voltage from the transducer is effectively unchanged while passing through the amplifier. An output device in this case a relay, is energized when the transducer output voltage reaches a predetermined threshold, as determined by a variable potentiometer voltage divider in the relay control circuitry.

Figure 4:
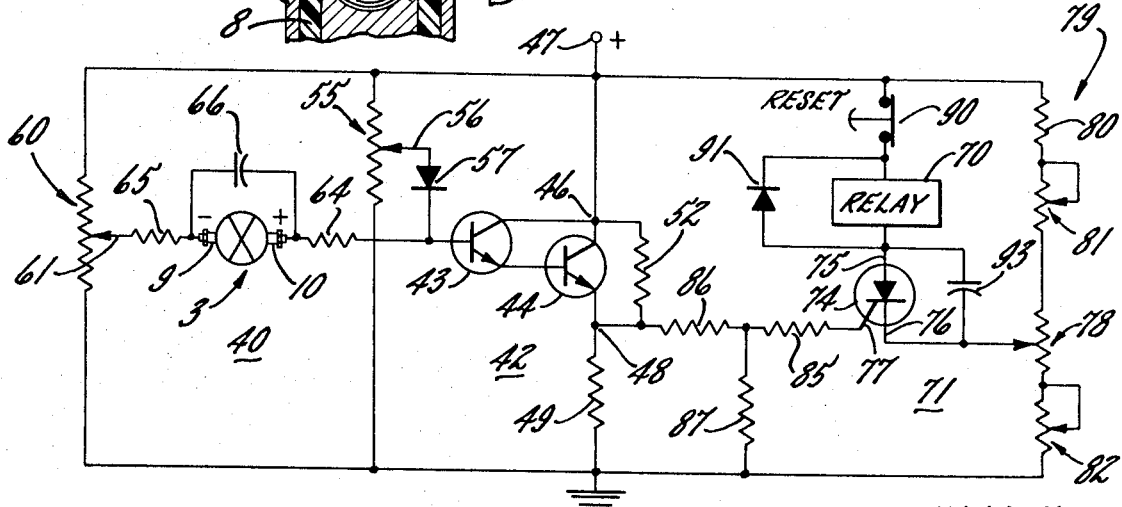
FIG. 4 is a diagram of a transducer sensing circuit constructed in accordance with the present invention.

Referring then to FIG. 4, there is shown an improved sensing circuit for use with the transducer 3, which is diagrammatically shown. The output terminals 9, 10 of the transducer couple the transducer into an input circuit 40 of a current amplifier 42. The amplifier 42 consists of a pair of direct-coupled transistors 43, 44 of the NPN variety. In the configuration shown, the transistors form what is commonly called an emitter follower-type Darlington pair in that they have their collectors connected together at a point 46 and with the emitter of the first transistor directly attached to the base of the second transistor. The collector connection 46 is tied directly to a positive DC supply terminal 47 while the emitter terminal 48 constitutes the output terminal for the amplifier and is connected to ground through a load resistor 49. A stabilizing resistor 52 having a value at least 10 times larger than the load resistor 49 connects the output terminal 48 to the positive supply bus 47. The Darlington transistor arrangement used herein is particularly attractive for this application, since, when properly biased, the effective dynamic input impedance of the amplifier is equal to the product of the beta (current amplification factor) of the first transistor 43, the beta of the second transistor 44, and its load impedance Typical silicon NPN transistors presently available may have current amplification factors of 100 or more when biased in their linear conduction range. Thus, in cascade, two such transistors will provide an amplification factor of 10,000. The input impedance of the amplifier 42 will be approximately 10,000 times the effective load resistance at the emitter terminal 48 which, for present purposes, will be at least 100 kilohms, making the input impedance to the amplifier 42 at least 1,000 megohms.

To obtain such a high input impedance from the amplifier 42 during static conditions, it is necessary to properly bias the input to render the transistors conductive in their linear range. To this end, the input circuit 40 includes a first voltage divider 55 connected between ground and the positive supply terminal 47. The voltage divider 55 in the present instance has the additional feature of being variable through the movement of its wiper arm 56. The divided output voltage present on the wiper arm 56 is applied to the base of the transistor 43 via a diode 57 which is poled to allow bias current to flow into the transistor 43. It is desirable to establish a bias voltage on the wiper arm 56 of the voltage divider which will render the transistors 43 and 44 conductive near the lower current end of their linear region of conduction. Assuming the transistors 43, 44 and the diode 57 to be silicon devices, approximately 1.8 volts must be impressed across their three semiconductor junctions before linear conduction is established. A second voltage divider 60, also in the form of a potentiometer, has a wiper arm 61 for establishing a reference voltage substantially equal to the bias voltage at the base of the first transistor 43 of the amplifier 42. The transducer branch includes the transducer 3 itself, a pair of band-pass control resistors 64, 65 in series with the transducer, and a conditioning capacitor 66 in parallel with the transducer. With the voltages at the opposite ends of the transducer branch being equal in the static condition of the circuit, zero current will flow through the transducer while it is in its inactive condition.

In operation, a stress on the piezoelectric transducer 3 will result in a voltage across the transducer of polarity indicated in FIG. 4. This voltage will be proportional to the stress applied, but it will be conditioned or limited by the loading effect of the condenser 66 so that its full-load output is approximately 9 volts. Since the condenser 66 is in parallel with the transducer, it does not act as an external biasing element so as to reduce the effectiveness of the transducer. As the voltage across the transducer rises, the output voltage from the amplifier 42 also rises in a 1:1 ratio. However, the current available to drive the emitter load resistors of the amplifier 42 will be several orders of magnitude greater than the transducer current. The only load impressed upon the transducer, other than that of its conditioning capacitor 66, will be the dynamic input impedance of the transistor pair 43, 44 and the reverse impedance of the directional diode 57, both of which are in excess of 10 megohms and provide a degree of isolation for the transducer.

In accordance with another aspect to the present invention, there is provided output indicating means including a relay 70 selectively controlled by a relay control circuit 71 which is adopted to energize the relay as the current-amplified transducer signal exceeds a predetermined threshold voltage. The relay control circuit includes a controlled rectifier 74 having anode, cathode and gate terminals 75, 76 and 77, respectively, with the cathode terminal 76 referenced to a variable voltage at the wiper of a potentiometer 78. The potentiometer 78 forms one part of a voltage divider 79 connected between ground and the positive supply terminal 47, which divider also includes a fixed resistor 80, a "coarse" control rheostat 81 and a "fine" control rheostat 82. The gate terminal 77 of the controlled rectifier 74 is connected to the output terminal 48 of the amplifier 42 through an input resistance 85 and a voltage divider consisting of resistors 86 and 87. Several different factors are operative to determine the transducer voltage necessary to trigger the rectifier 74 into conduction for energizing the relay 70. The controlled rectifier 74, typically a silicon device designated as an SCR, is rendered conductive when the voltage at the gate terminal 77 exceeds the reference voltage at the cathode terminal 76 by a fixed amount. Once the rectifier begins conducting, it will remain conducting so long as the current flowing through the anode-cathode junction remains sufficiently high. In the present instance the forward current of the rectifier 74 is limited by the resistance of the lower branch or leg of the potentiometer 78, together with the resistance of the rheostat 82. Preferably, the relay 70 is selected to be energized with the forward current through the silicon controlled rectifier 74 limited to substantially the minimum holding current, thereby minimizing power consumption. The threshold voltage which the rectifier will trigger is established by the reference voltage divider 79 and the gate voltage divider consisting of resistances 86 and 87. The potentiometer 78 is intended to be manually adjustable by way of a hand dial (not shown) which is calibrated to allow the user to easily choose the stress to be detected.

The entire circuit as described thus far acts only to initiate conduction in the relay 70 at the proper time and to maintain conduction. Means are also provided for deenergizing the relay 70. This is accomplished primarily by the reset switch 90 connected in series with the relay 70. The diode 91 is connected in parallel with the energization coil of the relay 70 and poled to dissipate the stored charge on the coil of the relay 70 at turnoff and to limit the reverse voltage buildup across the coil. The speed at which the relay deenergizes is further increased by a condenser 93 connected between the anode and the cathode terminals of the rectifier 74.

One of the primary features of this invention is the low power dissipation of the circuit. When the transducer is in its inactive state, the amplifier 42 draws only enough current to hold the transistors 43 and 44 in a state of minimum linear conduction. Only the voltage dividers 60, 55 and 89 draw appreciable current, and, with typical values for these branches, the total quiescent current necessary can be held to less than 10 milliamperes.

While the sensing circuit has been described in connection with a piezoelectric transducer, it should be appreciated that the circuit is equally useful with other high impedance transducers, such a photovoltaic devices and heat activated devices.

I claim as my invention:

1. An improved sensing circuit for use with a transducer of the type which produces its full electrical output only when it is substantially unbiased by externally applied voltages or currents, said sensing circuit comprising, amplifying means coupled to said transducer and including at least two direct-coupled transistors and bias means for supplying a bias voltage for said transistors, said amplifying means being operative to amplify the current produced by said transducer while maintaining the voltage thereof;

reference means coupled to said transducer for providing a reference voltage selected to establish a substantially zero voltage drop across said transducer under quiescent conditions;

an output relay; and relay control means coupled to said amplifying means and adapted to energize said relay as said transducer signal exceeds a predetermined threshold voltage.

2. An improved sensing circuit in accordance with claim 1 wherein said bias means includes a first voltage divider for providing a bias voltage for said transistors sufficient to render them conductive in their linear range, and said reference means includes a second voltage divider for providing a reference voltage substantially equal to said bias voltage, said transducer being coupled between said second voltage divider and said transistors, whereby zero current flows through said transducer under quiescent conditions.

3. An improved sensing circuit in accordance with claim 2 further including a diode connected between said first voltage divider and said transistors and poled to allow conduction of said biasing current while preventing loading of said transducer by said first voltage divider.

4. An improved sensing circuit according to claim 1 wherein said amplifier includes at least two direct-coupled transistors each having base, emitter and collector terminals, the emitter of the first transistor being coupled to the base of the second transistor and the collectors of both transistors being connected together.

5. An improved sensing device for detecting stress applied to a deformable body, comprising a transducer including a pair of mounting means fixed to said body substantially in line with the stress to be detected and a piezoelectric material stationed between said mounting means for providing a DC signal having a voltage substantially proportional to the stress applied to said body;

amplifying means coupled to said transducer for providing an output voltage which is linearly proportional to the voltage of the transducer signal;

detector means coupled to said amplifying means for providing an output indication when said output voltage exceeds a predetermined threshold and capacitive means coupled across said piezoelectric material for charging as stress is applied to said body, and means coupled to said capacitive means for causing said capacitive means to discharge to a completely discharged level when the stress is removed from said body, whereby said transducer is conditioned to respond to stresses which are intermittently applied to and removed from said body.

6. An improved sensing device according to claim 5 wherein said detector means includes a controlled rectifier having an anode, cathode and gate, and bias means coupled between said cathode and a point of reference potential for establishing said predetermined threshold; said amplifying means being coupled to the gate of said rectifier and being separated from said bias means by the gate-cathode circuit of said rectifier, whereby the output voltage from said amplifying means is substantially independent of the threshold level established for said detector means.

7. An improved sensing device for monitoring stresses which are intermittently applied to and removed from a deformable body, comprising, a transducer including a pair of brackets fixed to said body in line with the stress to be monitored and a piezoelectric material arranged between said brackets and adapted to produce a DC electrical output signal having a voltage proportional to the applied stress and a current;

capacitive means coupled across said piezoelectric material for charging towards a predetermined voltage limit as stress is applied to said body and for completely discharging as stress is removed form said body, isolation means comprising amplifying coupled to said transducer for amplifying the current of said transducer output signal while maintaining the voltage thereof, bias means for said amplifying means, and unidirectional means for connecting said bias means to said amplifying means;

an output relay; and relay control means coupled to said amplifying means and adapted to energize said relay when said transducer output signal exceeds a predetermined threshold voltage.

8. An improved sensing device according to claim 7 wherein said bias means provides a predetermined bias voltage and current for said amplifying means, further including a reference means for providing a reference voltage substantially equal to said bias voltage, said transducer being coupled between said reference means and said bias means, whereby substantially zero current flows through said transducer under quiescent conditions.

9. An improved sensing device according to claim 8 wherein said bias means and said reference means respectively comprise first and second voltage dividers, and said amplifying means comprises a pair of transistors connected to an emitter follower Darlington configuration.

10. An improved sensing device according to claim 9 wherein said unidirectional means comprise a diode connected between said first voltage divider and said transistors and poled to allow conduction of said bias current while preventing said fist voltage divider from loading said transducer, whereby said transducer output signal is impressed only on high impedances.

11. An improved sensing device according to claim 10 wherein at least one of said voltage dividers is a variable potentiometer having a wiper on which a divided voltage is present.

12. An improved sensing device according to claim 7 wherein said relay control means includes means for varying said predetermined threshold voltage in accordance with the amount of stress desired to be detected.

13. An improved sensing device according to claim 7 wherein said relay circuit means includes a variable voltage divider and a controlled rectifier having an anode terminal coupled to said relay, a cathode terminal referenced to said voltage divider, and a gate terminal connected to receive said amplified transducer signal, whereby conduction is initiated in said relay only when said transducer signal exceeds a threshold voltage established by said voltage divider.